United States Patent [19]
Bonsky et al.
[11] 3,729,589
[45] Apr. 24, 1973

[54] ADAPTER UNIT FOR TELEPHONE ANSWERING INSTRUMENT

[75] Inventors: Elmer C. Bonsky, Long Beach; Lawrence A. Curtis, Huntington Beach, both of Calif.

[73] Assignee: T.A.D. Avanti, Inc., Paramount, Calif.

[22] Filed: Sept. 29, 1971

[21] Appl. No.: 184,702

[52] U.S. Cl. ....................179/6 R
[51] Int. Cl. ....................H04m 1/64
[58] Field of Search ....................179/6 R, 6 AC, 6 C, 179/6 E, 1 C, 2 C, 2 A, 84

[56] References Cited

UNITED STATES PATENTS

| | | | |
|---|---|---|---|
| 2,743,315 | 4/1956 | Van Deventer et al. | 179/6 R |
| 2,147,820 | 2/1939 | Milde | 179/6 R |
| 2,525,763 | 10/1950 | Beaty | 179/6 R |
| 2,912,504 | 11/1959 | Dagnall et al. | 179/6 R |

*Primary Examiner*—Raymond F. Cardillo, Jr.
*Attorney*—Jessup & Beecher

[57] ABSTRACT

An improved electronic adapter unit is provided which is intended to be interposed between the telephone line and a telephone answering instrument, and which serves to disconnect the instrument from the phone line in the event the calling party hangs up, or is disconnected, so as to prevent dial tones, busy signals, or the like from being recorded by the answering instrument. The adapter unit of the invention finds particular utility in conjunction with the voice operated type of telephone answering instrument, since such instruments respond to the absence of signals on the phone line to turn themselves off, and often the presence of a dial tone, busy signal, or the like, cause the instrument to remain energized, and to continue to record the received tone, even though there is no message being received over the line.

2 Claims, 5 Drawing Figures

INVENTORS:
Elmer C. Bonsky
Lawrence A. Curtis
Jessup and Beecher
By Keith D. Beecher
ATTORNEYS INVENTORS:
Elmer C Bonsky
Lawrence A Curtis
Jump and Beecher
By Keith D. Beecher
ATTORNEYS Fig. 4 (Voice Actuation Circuit)
-112-
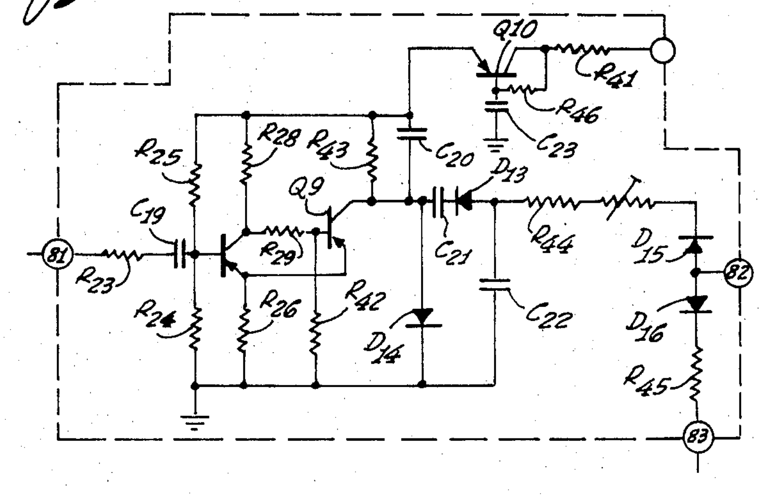
Fig. 5
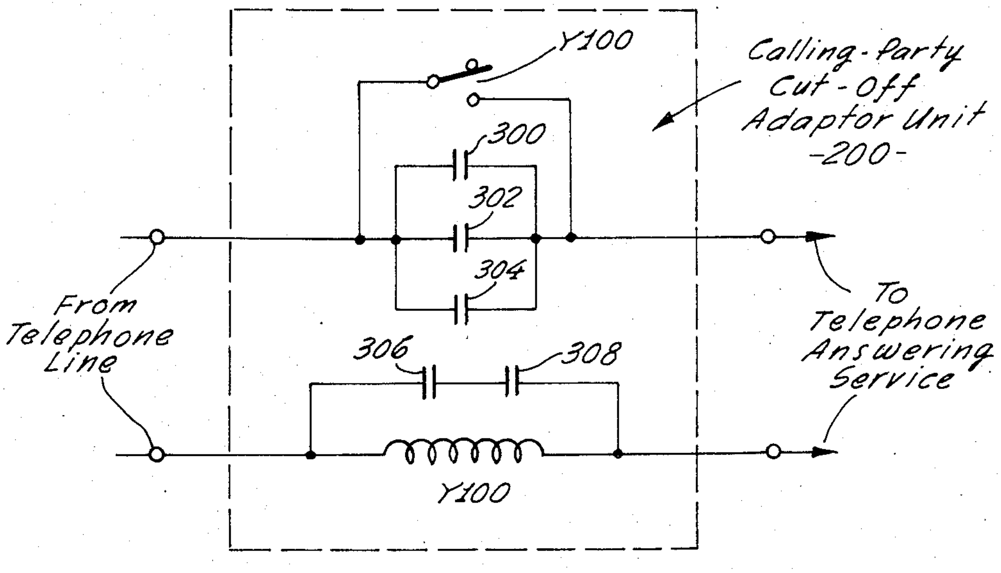
INVENTORS
Elmer C. Bonsky
Lawrence A. Curtis
Jenny and Beecher
By Keith D. Beecher
ATTORNEYS

ADAPTER UNIT FOR TELEPHONE ANSWERING INSTRUMENT

BACKGROUND OF THE INVENTION

A telephone answering system and apparatus is described and claimed, for example, in copending application Ser. No. 52,636 which was filed July 6, 1970. The telephone answering system and apparatus described in the copending application is of the general type which includes a sensing circuit which responds to a ring signal on the telephone line to activate the answering instrument. Upon the receipt of the ring signal, the instrument is energized, and a recorded message is transmitted over the line to the calling party. Subsequently, a message recording tape is activated within the answering instrument, in order that the calling party may record his message.

In the apparatus described in the copending application, the message recording equipment is voice actuated, so that the calling party is not limited to any particular prescribed time interval in which to record his message. Instead, as long as the calling party continues talking, his message is recorded. In a constructed embodiment of the instrument described in the copending application, up to 20 minutes of message storage time is provided.

However, and as explained briefly above, a situation could arise when the instrument of the copending application is directly coupled to the telephone line, whereby the calling party may hang up during the transmission of the message to him by the instrument. Then, when the instrument is ready to receive the message, a dial tone may occur on the line. The instrument then records the dial tone, and continues to do so until the end of the storage capability is reached. This means that the instrument has disabled itself from receiving any further messages, and the major part of its storage means has been used to record a useless tone signal.

The present invention provides an extremely simple adapter unit which is intended to be interposed between the telephone answering instrument and the phone line. The adapter unit responds to the hang-up of the calling party to disable the telephone answering instrument from the telephone line. This means that no dial tone, or other tone is recorded by the telephone answering instrument, and in the case of the voice operated type, and since there is no signal input to the instrument, it automatically turns itself off.

BRIEF DESCRIPTION OF THE DRAWINGS

FIG. 4 is a circuit diagram of the voice actuated circuit incorporated in the system of FIG. 2; and FIG. 5 is a circuit diagram of the simple circuit which may be incorporated into the aforesaid adapter unit.

DETAILED DESCRIPTION OF THE ILLUSTRATED EMBODIMENT

Figure 1:
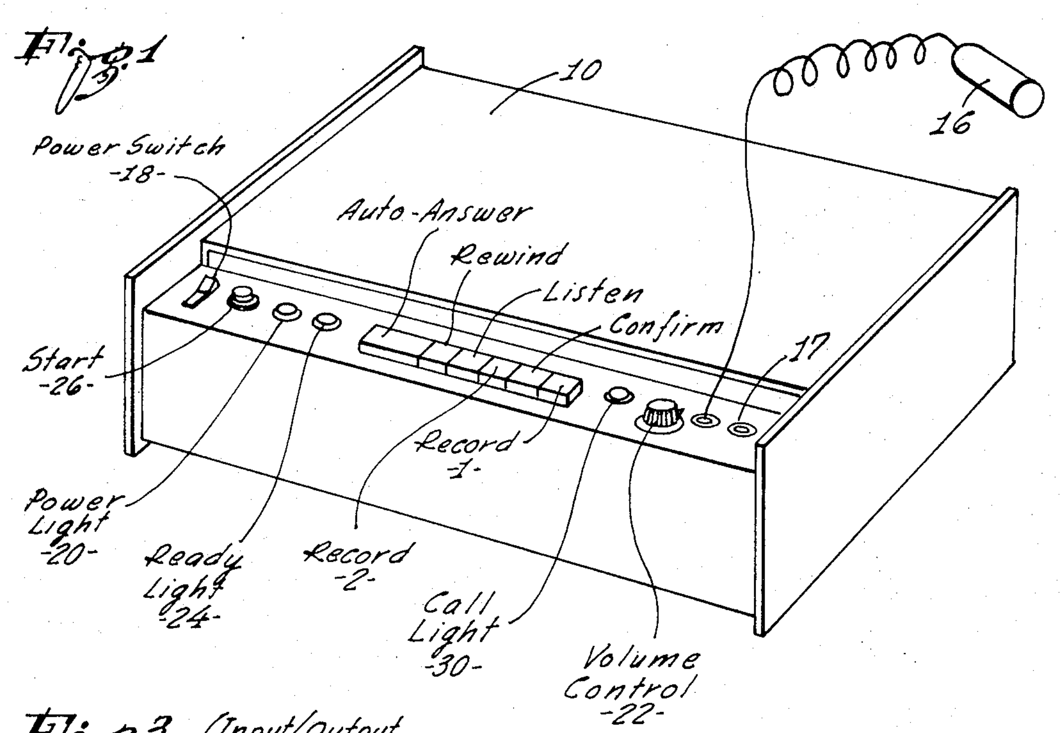
FIG. 1 is a perspective representation of a telephone answering instrument of the type described and claimed in the aforesaid copending application.

The telephone answering unit shown in FIG. 1 is of the type which is used directly with the telephone line, and it may be plugged into a usual telephone jack. The apparatus, as will be described, has the feature in that it operates independently of the telephone instrument, and does not require that the telephone instrument be placed on top of it, as is the case with most prior art units. The apparatus answers on the first ring, and it can be set either to a recording mode or to an "announce only" mode, insofar as incoming calls are concerned. The unit provides either a fixed time for recording each incoming call, or a voice operated recording interval, so that an incoming call continues to be recorded so long as the calling party continues to speak. The apparatus has two-way conversation recording capabilities. It also is capable of monitoring incoming calls through an internal speaker. When the message recording tape is full of recordings of incoming calls which have been processed, the unit automatically converts to an announce only mode, so that it continues to answer incoming calls. The unit is also capable of remote control, which includes a complete playback operation, including stop, start, repeat, store and reset from any telephone anywhere.

The improved adapter unit of the present invention is interposed between the instrument of FIG. 1 and the telephone line, so as to isolate the unit from the telephone line when the calling party hangs up, and for the reasons discussed above.

The particular unit shown in FIG. 1 includes a housing 10 for the electrical control circuitry, and for supporting a control panel. A microphone 16 may be plugged into a receptacle 17 on the control panel for recording announcements or dictation, as will be described. A series of push-button switches are mounted on the control panel, and these are designated "Auto Answer," "Rewind," "Listen," "Confirm," "Record 1," and "Record 2." A thumb operated "On-Off" power switch 18 is also located on the control panel, and a thumb actuated volume control 22 is mounted on the control panel. In addition, a series of indicator lights designated "Power", "Ready" and "-Call" are also mounted on the control panel, these lights being designated 20, 24 and 30 respectively.

In order to install and operate the system shown in FIG. 1, it is plugged into a usual 110 volt AC outlet. The unit is also plugged directly into a telephone jack, or otherwise connected to the telephone line.

As will be described, the telephone answering system is equipped with a loop announcement tape on which an announcement is recorded, so that any time a telephone ring signal is received, the announcement is automatically made to the caller. In order to record the announcement on the loop announcement tape, the power switch 18 is first switched off, and the power light 20 is then out. The microphone 16 is then plugged into the jack 17 on the control panel of the instrument, and the volume control 22 is turned to a predetermined position. The "Record 1" push-button switch is then depressed, and the power switch 18 is turned on. The "Ready" light 24 will then glow, and the loop announcement tape will automatically set itself to its origin position, at which time the "Ready" light 24 will be extinguished. The "Test" push-button switch 26 is then pushed and released, and the announcement to be recorded on the loop tape is spoken into the microphone 16. In a typical embodiment, the loop announcement tape is controlled so that 20 seconds, for example, are provided for recording the announcement. After the announcement has been recorded, the microphone 16 should be unplugged.

To confirm the announcement, the power switch 18 is turned off and the "Confirm" push-button switch is then depressed and the power switch is turned on. The announcement is then reproduced by a speaker SP (FIG. 2) in the instrument.

The instrument also includes a message tape on which the incoming calls are recorded. The message tape, as will be described, is wound from a supply reel to a take-up reel. After the announcement has been recorded on the loop announcement tape, in the manner described above, the "Rewind" push-button switch is depressed so as to rewind the message tape and place it at its "Start" position. The instrument is now conditioned to answer incoming calls automatically. In order to set the instrument for such a function, the power switch 18 is turned off, and the "Auto" push button is depressed. The power switch 18 is then turned on. At this time, the power light 20, the "Ready" light 24 and the "Call" light 30 are all on. The Call light 30 remains on until a message is received.

Therefore, if upon returning to the office, the subscriber finds that his "Call" light 30 is still on, he does nothing because there are no recorded messages. However, if the "Call" light 30 is off, he turns the power switch 18 to off, and then pushes the "Rewind" push-button switch. He then turns the power switch on, and waits until the "Call" light 30 is energized, indicating that the message tape has been rewound. The power switch 18 is again turned off, and the "Listen" push-button switch is pressed. The power switch is turned on and the message tape is activated so that all the recorded messages are reproduced through the speaker SP (FIG. 7) of the instrument. The volume control 22 may be adjusted to any desired volume level.

In order to erase the messages, the power switch 18 is turned off, and both the "Rewind" and "Record 2" push-button switches are depressed at the same time. The power switch 18 is then turned on and when the "-Call" light 30 is energized, indicates that the message tape has been returned to its origin position, and that the previous calls have been erased. The power switch is then turned off, and the automatic answer switch "Auto" is depressed. Then the power switch is turned on and the instrument is ready to record additional incoming calls.

The instrument of FIG. 1 may be used as a dictating machine, if so desired. For that purpose, the power switch 18 is turned off and the microphone 16 is plugged into the jack 17. The "Record 2" push button is depressed, and the volume control 22 is set to a desired recording level. The power switch 18 is turned on, and messages may be dictated into the microphone 16 to be recorded on the message tape. To replay the dictation, the power switch 18 is turned off, and the "Rewind" push button is depressed.

The power switch 18 then is turned on to return the message tape to its origin position, as indicated by the energization of the "Call" light 30. The power switch 18 is then turned off and the "Listen" push-button switch is depressed. Then the power switch is turned on, and the dictation is reproduced through the speaker SP (FIG. 2) of the instrument. At the end of the dictation, the power switch 18 is again turned off. To erase the dictation, the same operation as above is carried out. That is, the "Rewind" and "Record 2" push-button switches are both depressed, and the power switch is turned on. The "Call" light 30 will be energized when the message tape has returned to its origin position, at which time the previous recordings on the tape will have been erased.

Incoming calls may be listened to by setting a monitor switch (FIG. 2) on the back of the housing 10. This connects a speaker SP (FIG. 2) into the circuit, so that incoming messages may be monitored as they are being recorded. Outgoing calls may be made merely by turning off the instrument and by using the telephone in a normal manner.

Figure 2:
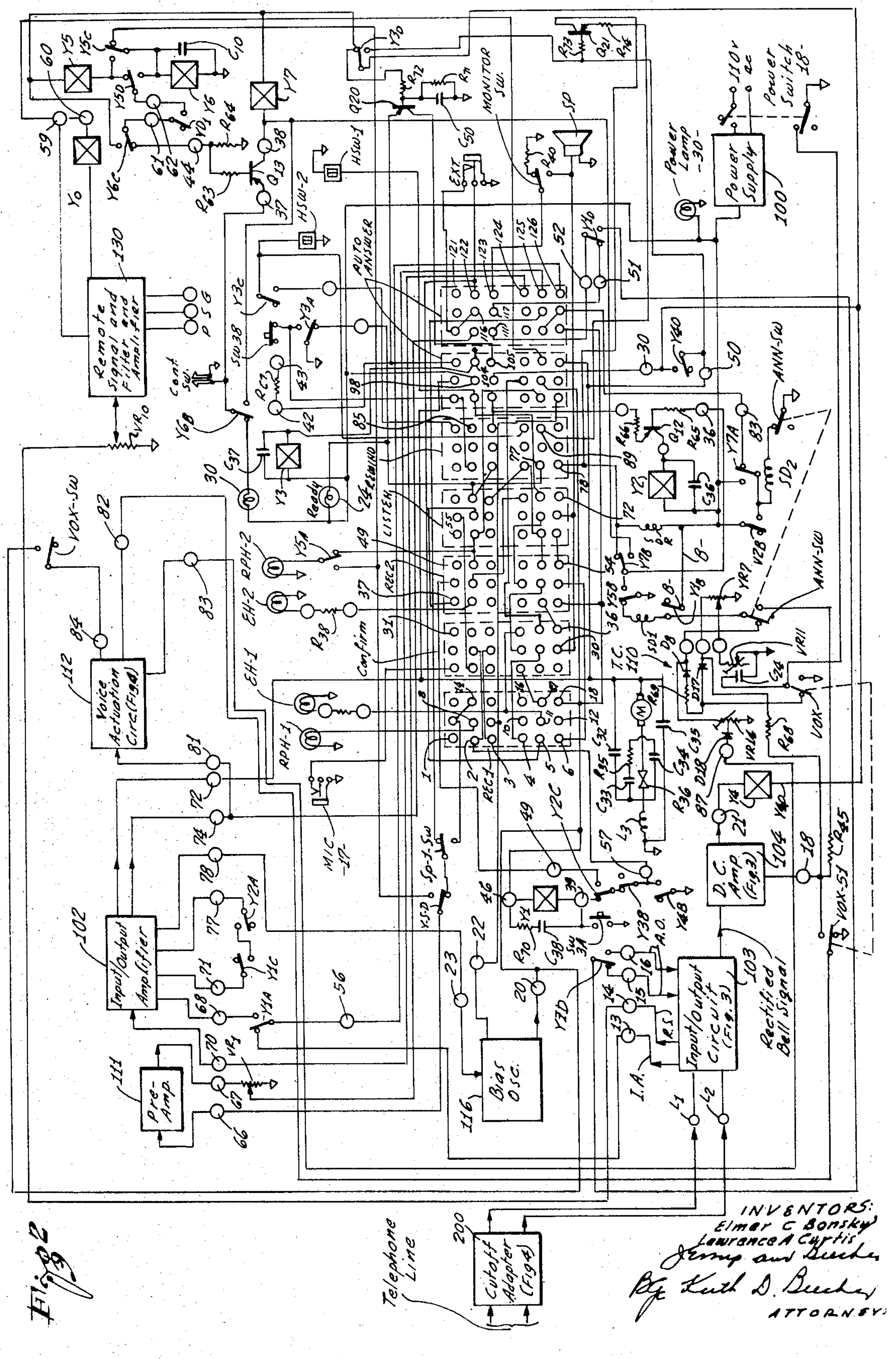
FIG. 2 is a diagram, partly in block form and partly in circuit detail, showing the electronic system which may be incorporated into the instrument of FIG. 1, and which makes the instrument a voice actuated type.

As shown in the diagram of FIG. 2, for example, the circuitry of the instrument of FIG. 1 includes a pair of input terminals L1 and L2 which are connected through an adapter unit represented by the block 200 to the telephone line. The adapter unit incorporates the concepts of the present invention, and is shown in circuit detail in FIG. 4.

The push-button switches described in conjunction with FIG. 1 are six-pole, double-throw switches as shown in FIG. 2. For example, when the "Record 1" push-button switch is not actuated, its common terminals 2, 8 and 14 connect respectively with the upper terminals 1, 7 and 13, and its lower common terminals 5, 11 and 17 connect respectively with its upper terminals 4, 10 and 16. However, when the push-button switch is actuated, its common terminals 2, 8 and 14 connect respectively with its lower terminals 3, 9 and 15, whereas its common terminals 5, 11 and 17 connect respectively with its lower terminals 6, 12 and 18. This also applies to the "Confirm" push-button switch, the "Record 2" push-button switch, the "Listen" push-button switch, the "Rewind" push-button switch, and the "Auto Answer" push-button switch.

As a preliminary setting for the system, it will be assumed that the "Auto Answer" push-button switch has been depressed, so that the system is in the stand-by mode awaiting an incoming ring to set it in operation. For that mode, the common terminals 92, 98, 104, 110, 116 and 122 of the "Auto Answer" push-button switch are connected respectively to the terminals 93, 99, 105, 111, 117 and 123; and the common terminals 95, 101, 107, 113, 119 and 125 are connected respectively to the terminals 96, 102, 108, 114, 120 and 126.

For the actuated position of the "Auto Answer" switch, and when the power switch 18 is on, the power supply 100 in FIG. 2 is energized, so that a negative direct voltage is applied to the lead designated B–. This negative voltage causes the Power lamp 20 to be energized. Also, the message tape is assumed to be at its origin position, so that the switch CONT-SW, which is also shown in FIG. 2, is closed, and so that the "Call" lamp 20 also is energized. The Ready lamp 24 is also on, as its path is returned through the normally closed contacts Y3A of FIG. 2 to ground.

Figure 3:
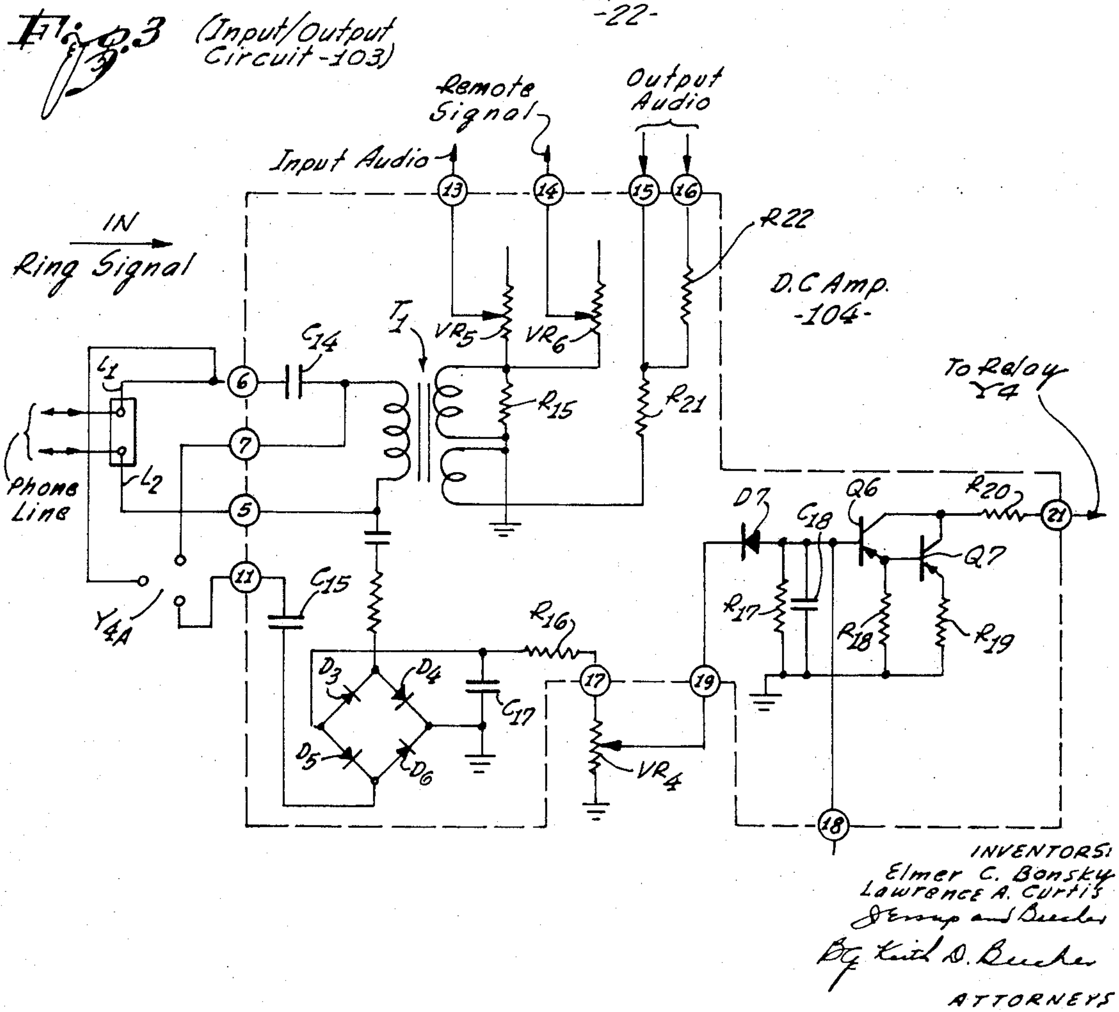
FIG. 3 is a circuit diagram of certain of the components of the electronic system of FIG. 2.

Now, should a ring signal be received on the phone line, the signal is introduced by way of input terminals $L_1$ and $L_2$ to the input and output circuit 103 of FIG. 2, and it appears across a ring rectifier. As shown in FIG. 3, the ring rectifier is made up of diodes D3, D4, D5 and D6; a pair of capacitors C15 and C16, each having a capacity, for example, of 0.50 microfarads; and a resistor R14, having a resistance of 50 kilo-ohms, connected as shown in FIG. 3. The ring signal is introduced to the rectifier through the normally closed relay terminals Y4A (FIG. 3). The resulting rectified signal charges a grounded capacitor C17 of 50 microfarads, and appears as a direct current voltage across a 50 kilo-ohm resistor R16 and a potentiometer VR4 shunting the capacitor. The potentiometer VR4 serves as a ring signal sensitivity control.

The ring signal is introduced to a direct current amplifier 104 through a silicon diode D7, the direct current amplifier being formed of a pair of PNP transistors Q6 and Q7 and associated circuitry, connected as shown in FIG. 3. The direct current amplifier includes a 22 kilo-ohm resistor R17, a 50 microfarad capacitor C18 connected to ground and to the base of the transistor Q6, a 500 resistor R18 connected to the emitter of the transistor Q6 and a 10 ohm resistor R19 connected to the emitter of the transistor Q7, both the resistors R18 and R19 being grounded.

The direct current amplifier 104 now draws current through a 100 ohm resistor R20 and through a relay Y4 (FIG. 2) to energize the relay. The energization of the relay Y4 causes the contact Y4A to close (FIG. 3) placing the primary of a transformer T1 across the input terminals $L_1$ and $L_2$ and shunting out a 0.1 micromicrofarad blocking capacitor C14. The relay contacts Y4B also close when the relay Y4 is energized, causing the relay Y1 to be energized. When the relay Y1 is energized, the contacts Y1A close so that incoming messages may be fed to the input/output amplifier circuit 102 of FIG. 2.

When the relay Y1 is energized, it also closes the contacts Y1B so as to connect the negative lead (B–) to a timer circuit 110 (FIG. 2). The timer circuit is energized through normally closed contacts of one section of an Announce-Record switch. These contacts are connected through a diode D8 in a timer circuit to a 400 ohm resistor R69. The resistor R69 is connected back through a diode D19 to a 100 kilo-ohm potentiometer VR7. The potentiometer VR7 is connected to a further 10 kilo-ohm potentiometer VR11 which, in turn, is connected to ground. The potentiometer VR7 is also connected through a 5 kilo-ohm resistor R68 which is connected back to the DC amplifier 104 and, by way of terminal 18 of that amplifier to the base of the transistor Q6 (FIG. 3).

The aforesaid contacts of the Announce-Record switch are also connected to a grounded potentiometer VR14 having a resistance of 10 kilo-ohms. The output terminal 82 of the voice actuation circuit 112 is connected to that potentiometer through a silicon diode D18. The terminal 82 of the voice actuation circuit is connected by way of one section of a Vox-SW switch to the input terminal 18 of the DC amplifier 104. The Vox-SW switch has a further section with normally closed contacts connected to a capacitor C24 and to the junction of resistor 69 and diode D19, and with normally open contacts connected to ground. The capacitor C24 may have a capacity of 100 microfarads and it is grounded.

The Vox-SW switch has yet another section connected to the terminal 84 of the voice actuation circuit. When the three sections of the Vox-SW switch are in their illustrated positions, the system is set for a predetermined time interval for recording calls on the message tape, the time interval being established by the discharge time of the capacitor C24 through the various resistances and potentiometers associated therewith. However, when the three sections of the Vox-SW switch are in the other position, the time interval of each message is controlled by the output from the voice actuation circuit 112, so that as long as the calling party continues talking, his message is recorded on the message tape.

The latter control is accomplished by the voice actuation circuit 112, as shown in circuit detail in FIG. 4. In the manner to be described, the audio signals representing the incoming calls are applied to the input terminal 87 and are amplified by the amplifier circuit of the transistors Q8 and Q9. The terminal 87, as shown, is connected to a 3.3 kilo-ohm resistor R24 which, in turn, is connected to a 7 microfarad capacitor C19. The capacitor C19 is connected to the junction of a pair of resistors R24 and R25 and to the base of the transistor Q8. The resistor R24 is grounded, and it has a resistance of 4.7 kilo-ohms. The resistor R25, on the other hand, has a resistance of 120 kilo-ohms. The collector of the transistor Q8 is connected to a 6.8 kilo-ohm resistor R28 and to an 8.2 kilo-ohm resistor R29.

The emitter of the transistor Q8 and the emitter of the transistor Q9 are connected to a common grounded 47 ohm emitter resistor R26. The resistor R29 is connected to a grounded 4.7 kilo-ohm resistor R42 and to the base of the transistor Q9. The collector of the transistor Q9 is connected to a 6.8 kilo-ohm resistor R43. The resistors R25, R28 and R43 are all connected to the emitter of a voltage stabilizing transistor Q10. The base of the transistor Q10 is connected to a grounded 100 microfarad capacitor C23 and to a resistor R46 of 4.7 kilo-ohms. The collector of the transistor Q10 and the resistor R46 are connected through a 10 ohm resistor R10 to the terminal 84 of the voice actuation circuit. As shown in FIG. 2, this terminal is connected to the third section of the Vox-SW switch, so that the voice actuation circuit 112 is energized only when the Vox-SW switch is placed to the other position.

The collector of the transistor Q9 is connected to a 10 microfarad capacitor C21 which, in turn, is connected to a grounded silicon diode D14 and a further silicon diode D13. The cathode of the silicon diode D14 is grounded, and the anode of the silicon diode D13 is connected to a grounded capacitor C22 of 200 microfarads and to a 4.7 kilo-ohm potentiometer R44. The potentiometer VR13 is connected through a silicon diode D14 to the terminal 82 of the voice actuation circuit, and the terminal 82 is connected to a section of the switch Vox-SW, one terminal of which is grounded and the other is connected to a 10 kilo-ohm resistor R45 to the terminal 83.

The audio signal appearing at the output of the transistor Q9 is rectified and caused to charge the capacitor C22. The capacitor retains its charge so long as there is an audio output from the amplifier. However, when the audio output is terminated, the capacitor C22 discharges through the resistances and potentiometers associated therewith both in the voice actuation circuit 112 and in the timer circuit 110, its discharge time being set, for example, by a setting of the potentiometer VR14. At the end of the discharge time, the bias voltage is removed from the terminal 18 of the DC amplifier 104, and this causes the relay Y4 to be de-energized and disconnect the system from the telephone line.

The relay Y4 is held energized during the voice actuated mode (Vox), so long as the calling party is talking and maintains the capacitor C22 in the voice actuation circuit 112 of FIG. 4 in a charged condition. In the timed mode, the relay Y4 is held energized so long as the capacitor C24 in the timer circuit 110 retains its charge. In each case, the relay Y4 remains energized so long as the terminal 18 of the DC amplifier 104 is sufficiently negative to maintain the transistor Q6 in the amplifier in a conductive condition.

As mentioned above, the initial energizing of the relay Y4 causes the contacts Y4B to close, so that the relay Y1 is energized to set the system to the announcement transmitting mode. It will be appreciated that so long as the relay Y1 is energized, the timing cycle of the timer or of the voice actuated circuit does not begin. This is because the capacitor C24 of the timer circuit 110 is maintained in its charged state during the announcement mode by the closed contacts Y1B, so that the appropriate bias is applied directly to the DC amplifier 104 to hold the relay Y4 energized.

It is only after the relay Y1 is de-energized and the system switched to its message receiving and recording mode by the energization of the relay Y2, that the timing cycle begins. The relay Y4 is de-energized a certain time after the beginning of the message recording mode to disconnect the system from the phone line. The particular time interval depends upon whether the system is in the fixed message recording time mode, or is set to the voice actuated message recording time mode.

The energizing of the relay Y4 when the system is first switched from its stand-by mode to its announcement mode by the receipt of a telephone ring signal also causes the relay contacts Y4D to close to energize the motor M. The motor circuit M., as shown in FIG. 2, includes a filter choke L3, and it also has an associated filter network including capacitors C32, C33, C34 and C35. These capacitors have values of 0.1, 10, 0.01 and 0.5 microfarads, respectively. The filter network also includes a resistor R36 having a resistance, for example, of 10 ohms.

The motor M remains energized so long as the system is operational. The motor drives both the announcement tape 60 and the message tape 64 when their corresponding pinch roller assemblies are actuated by the selective energization of the solenoids SD1 and SD2. When the relay Y1 is energized, the system is set to its announcement mode, and the relay contacts Y1B close to charge the capacitor C24 in the timer circuit 110 so as to apply the necessary bias to the DC amplifier 104 to hold the relay Y4 energized. The solenoid SD1 is also energized during this mode, and this solenoid actuates the pinch roller assembly associated with the announcement tape transport (not shown) and causes the announcement tape to be driven. The playback head RPH–1 associated with the announcement tape senses the announcement on the tape, and applies the audio signals corresponding to the announcement through the microswitch SD1–SW (which is now actuated) to the pre-amplifier circuit 111. The output from the pre-amplifier is then applied to the input/output amplifier 102, and the amplified output from the latter amplifier is applied to the input/output circuit 103, so that the announcement may be applied to the telephone line.

During the announcement mode, and as described above, the relays Y4 and Y1, and the solenoid SD1 are energized, and the announcement signal is read by the read head RPH–1, passed through the actuated switch SD1–SW, and amplified by the amplifiers 111 and 102, as described above. The amplified announcement from the input/output amplifier 102 is applied to the lower winding of the transformer T1 in the input/output circuit 103 of FIG. 3 through the contact Y2D and terminal 16 of FIG. 2 and through a pair of resistors R21 and R22 of 50 and 100 ohms respectively. In this way, the recorded announcement on the announcement tape 60 is transmitted over the phone line. At the end of the announcement, the element 62 of FIG. 6 actuates the switch HSW–1, and this causes the relay Y2 to be energized. The system is now switched from its announcement mode when the relays Y4 and Y1 are energized, to its message receiving mode when the relays Y4 and Y2 are energized.

The energization of the relay Y2 is achieved through the closed contacts 92 and 93 of the actuated "Auto Answer" push-button switch, and through a 5 ohm resistor R66 connected to the emitter of the transistor Q12, the collector of which is connected to the relay Y2. The other terminal of the terminal Y2 is connected to the B– lead. When the relay Y2 is energized, the relay contacts Y2C are actuated so as to de-energize the relay Y1. This causes the contacts Y1B to open removing the unidirectional potential from the timer circuit 110, and initiating the timing cycle. At the same time, the contacts Y2B close energizing the solenoid SD2 which, in turn, actuates the pinch roller causing the message tape to be actuated. The incoming message from the calling party is now recorded on the message tape.

The incoming message is amplified in the amplifier 102, and its output from terminal 78 is applied to the bias oscillator 116 by terminal 23 to modulate the alternating current bias output signal. Then, the modulated bias signal is applied to the switching contact 96, and then to the switch contact 95, and from there to the record head RPH–2 through the switch contact 56. Therefore, during the message recording mode, the incoming message signal modulates the alternating current signal from the bias oscillator, and the resulting modulated signal is recorded on the message tape by the record head RPH-2.

At the same time, the output from the input/output amplifier 102 is fed to the switch contact 110 by the output terminal 74, and from there it is switched to the switch contact 111 and through the normally closed relay contacts Y1D to the switch contact 117, and from there to the switch contact 116, and through the switch contact 109 to the extension jack marked EXT. Therefore, the incoming messages may be monitored, merely by plugging a speaker into the extension jack EXT. The incoming messages may also be monitored by the speaker SP by moving the adjacent "Monitor" switch to the down position.

It will be understood, therefore, that during the announcement mode, the relays Y4 and Y1 are energized so that the announcement tape is actuated and the timer circuit 110 is set. During the message receiving and recording mode, the relay Y4 remains energized, and the relay Y2 is energized, but the relay Y1 is de-energized. When the relay Y1 is de-energized, the solenoid SD1 is de-activated so that the announcement tape is stopped at its origin position, as established by the closure of the switch HSW–1.

As mentioned above, so long as the message receiving and recording mode continues, the signal applied to the DC amplifier 104 by way of the input terminal 18 maintains the relay Y4 energized. At the end of the timed cycle the capacitor C24 discharges in the timer circuit 110, or during the voice actuated mode, the capacitor C22 discharges in the voice actuation circuit 112 of FIG. 10, to remove the signal from the DC amplifier 104 so that the relay Y4 is de-energized.

When the relay Y4 is de-energized, the system returns to its stand-by mode. The contacts Y4B return to their normally open position, and the relay Y1 cannot again be energized until the relay Y4 is again energized. The relay Y2 is also de-energized at this time, causing the contacts Y2B to open and thereby de-energizing the solenoid SD2 to stop the message tape. When Y4 is de-energized, the relay Y2 is de-energized since the contacts Y2C not only serve to de-energize Y1 when Y2 is energized, but also form a holding circuit for the relay Y2. Then, when the relay Y4 is de-energized the contacts Y4B open to open the holding circuit for the relay Y2, and therefore the relay Y2 also is de-energized.

The Rewind operation is instituted by actuating the "Rewind" push-button switch which comprises the switch contacts 73–90 in FIG. 2. This, as mentioned above, causes the contacts 74, 80 and 86 to break with the contacts 73, 79 and 85, respectively, and to engage the contacts 75, 81 and 87; and causes the contacts 77, 83 and 89 to break with the contacts 76, 82 and 88, and to engage selectively with the contacts 78, 84 and 90.

When the "Rewind" push-button switch is depressed, a ground is established at the upper end of the rewind solenoid SDR through the switch contacts 77 and 78, and through normally closed contacts Y3A of a protective relay Y3. The rewind solenoid SDR remains energized until the protective relay Y3 is energized. The relay Y3 is shunted by a 200 microfarad capacitor C37. The energizing of the solenoid SDR causes the message tape to rewind until the sensing element 65 causes the switch G–SW2 to close. When that occurs, the protective relay Y3 is energized through the start switch SW3B (FIG. 2), through a 10 kilo-ohm resistor R67, through the circuit of a transistor Q20, and through switch contacts 105 and 104.

When the protective relay Y3 is energized, the normally closed contacts Y3A open to cause the rewind solenoid SDR to be de-energized, and the normally open contacts Y3A closed to form a holding circuit for the relay Y3. The normally closed contacts Y3B also open to assure that the relay Y1 is de-energized, and the normally open contacts Y3C close. When the contacts Y3C close, the message mode relay Y2 becomes energized to energize the solenoid SD2 to cause the message tape to start in its forward direction. The message tape moves forward until the element 65 moves off the switch HSW–2. When that occurs, the relay Y2 is de-energized, and the system is ready for the next cycle.

The output terminal 74 of the input/output amplifier 102 of FIG. 2 is also connected to the input terminal 81 of the voice actuation circuit 112. The circuit details of the voice actuation circuit are shown in FIG. 4. The input terminal 81 is connected to the resistor R23 having a resistance of 3.7 kilo-ohms, and the resistor is connected to a 1 microfarad capacitor C19. The capacitor C19 is connected to the base of a transistor Q8 and also to the junction of a pair of biasing resistors R24 and R25. The resistor R24 is grounded, and has a resistance of 4.7 kilo-ohms. The resistor R25 has a resistance of 120 kilo-ohms.

The emitter of the transistor Q8 is connected to the emitter of a further transistor Q9 and to a grounded 47 ohm resistor R26. The collector of the transistor Q8 is connected to a 6.8 kilo-ohm resistor R28 and to an 8.2 kilo-ohm resistor R29. The resistor R29 is connected to a grounded 4.7 kilo-ohm resistor R42 and to the base of the transistor Q9. The collector of the transistor Q9 is connected to a 6.8 kilo-ohm resistor R43 which is shunted by a 4.7 microfarad capacitor C20. The resistors R25, R28 and R43 are all connected to the emitter of a voltage stabilizing transistor Q10, the collector of which is connected to the base through a 4.7 ohm resistor 46 and through a 10 ohm resistor R41 to a terminal 84. The base of the transistor Q10 is connected to a grounded 100 microfarad capacitor C23.

The exciting potential for the voice actuation circuit is applied to the terminal 84 whenever the adjacent Vox-SW switch (FIG. 2) is set to the upper position. So long as the Vox-SW switch is in the illustrated position, the voice actuation circuit 112 is not active, and that occurs when the system is set in its timed mode, and the timer circuit 110 establishes a predetermined time interval for each message to be recorded on the message tape. As mentioned above, when the voice actuation circuit 112 is active, the messages may continue to be recorded on the message tape so long as there is an audio input to the voice actuation circuit.

The input audio signal applied to the voice actuation circuit 112 when it is energized causes an amplified signal to be produced in the collector circuit of the transistor Q9. This signal is rectified by a pair of diodes D12 and D14, and is introduced to the junction of the diodes through a 10 microfarad capacitor C21. The positive half-cycles of the audio signals are bypassed to ground through the diode D14, but the negative half-cycles draw unidirectional current into the capacitor C22, and cause the capacitor to assume a charge.

So long as the capacitor C22 remains charged, the output terminal 82 causes a negative bias to be applied to the DC amplifier 104 in FIG. 2, so that the relay Y4 is held energized, which is essential to maintain the system effectively connected to the phone lines. The timer capacitor C24 in the timer circuit 110 is disconnected and discharged at this time by the silicon of the Vox-SW switch adjacent the timer circuit. However, at the end of an incoming message, the capacitor C22 begins to discharge through the resistor R44 and through the associated potentiometer VR13 in the timer circuit 110. The parameters of the resistance-capacitance circuit are such that the discharge time constant is relatively fast, as compared with the discharge time of the capacitor C24 in the timer circuit when the system is in the fixed time message recording mode of operation.

A feature of the system described in the copending application is that it may be controlled from a remote point, and merely by introducing a tone of a predetermined frequency into the phone line by the unit, for example, described in conjunction with FIG. 2. The system must be in the "Auto Answer" mode in order to process the tone signal, that is, the "Auto Answer" push-button switch must be actuated. Assuming at that time that a number of previous messages have already been recorded on the message tape 34 of FIG. 5, then, upon the receipt of the tone signal, the system is automatically placed in the "Rewind" mode, so that the message tape is rewound to its origin position. The system is then placed in its "Listen" mode, and the messages recorded on the message tape are now, instead of being fed into the loudspeaker SP, it is fed through the input/output amplifier 102 to the telephone line so that the messages may be heard by the person originating the tone signal.

The system includes a remote signal filter and amplifier designated 130 in FIG. 2. The remote tone is introduced to the amplifier from the input/output circuit 103, and it appears across a potentiometer VR10 at the input of the circuit 130, so that the received tone signal may be introduced into the circuit by way of the input terminal 58, and with a selected amplitude level divided by the adjustment of the potentiometer VR10. The remote signal is derived across a winding of the transformer T1 in the input/output circuit of FIG. 6, which winding is shunted by a 600 ohm resistor R15, and the signal is applied to the remote signal amplifier circuit 130 by way of a potentiometer VR6 and output terminal 14 of the input/output circuit.

It will be appreciated, and as mentioned above, that with the voice actuated system described above, it is possible for the calling party to hang up when the system of FIG. 2 is ready to accept a message, and to cause the dial tone to reappear on the line. Then, the system responds to the dial tone, and the dial tone is recorded for the duration of the remaining available space on the message recording tape.

The aforesaid situation is prevented by the cut-off adapter 200 which, as stated, is interposed between the telephone line and the input/output circuit 103, and which is shown in circuit detail in FIG. 5. The adapter unit includes a plurality of capacitors 300, 302 and 304 which are connected in parallel, and which are interposed in one of the lines extending through the adapter. A pair of normally open relay contacts designated Y100 are connected across the shunted capacitors. The energizing coil for the relay Y100 is interposed in the other lead extending through the adapter unit, and the energizing coil is shunted by a pair of capacitors 306 and 308 connected in series. All the capacitors in the unit may have a value, for example, of 0.47 microfarads.

The adapter unit operates in a manner such that when a ring signal appears across the telephone lines, it passes through the capacitors to the telephone answering unit. The value of the capacitors is such that they present a relatively low impedance to the frequency of the ring signal. The ring signal, therefore, is introduced to the input/output circuit 103, and in the manner described above causes the telephone answering system of FIG. 2 to be turned on, thereby establishing a current flow through the telephone line and through the energizing coil Y100. The relay Y100, therefore, becomes energized, and it normally remains energized so long as the telephone answering system of FIG. 2 is energized.

However, a change in the telephone current should the calling party hang up, or any other change in the telephone line current due, for example, to a dial tone, busy tone, error signal, or the like, immediately causes the relay Y100 to de-energize so that the relay contacts Y100 open thereby isolating the telephone answering system of FIG. 2 from the telephone line. The resulting lack of input to the telephone answering system of FIG. 2 causes the voice operated circuit to turn off the unit. Therefore, with the adapter interposed in the system, there is no possibility of dial tones, or other unwanted signals to maintain the telephone answering system of FIG. 2 energized, or to be recorded on the message tape of the answering instrument.

It is also to be noted that should the telephone answering system of FIG. 2 shut itself off, due to the fact that the calling party has discontinued talking, but before the calling party hangs up, the relay Y100 will become de-energized, causing the relay contacts in the adapter unit to open. In this way, the system, as before, is isolated from the telephone line, and there is no possibility for unwanted signals to reactivate the unit and be recorded. The circuit of the adapter unit is such that only the telephone ring signals have sufficient frequency to be passed to the unit with sufficient amplitude to activate it. All other signals are attenuated in the adapter unit unless the relay contacts Y100 are closed.

The invention provides, therefore, a simple and straightforward adapter unit which may be interposed between a telephone answering instrument and the telephone line, and which serves to protect the instrument against unwanted signals. Although a particular type of telephone answering instrument has been described herein, it will be appreciated that the adapter unit may be used with a variety of different telephone answering instruments, and has a universal application in protecting such instruments against unwanted signals on the telephone line.

What is claimed is:

1. An adapter unit to be interposed between a telephone answering system and a telephone line for normally isolating the telephone answering system from the telephone line and for connecting the telephone answering system to the telephone line in response to a ring signal, said telephone answering system including an input/output circuit having an audio network and a telephone ring network, and further having first relay means connected to said telephone ring network and including contact means connected to said audio network, said telephone ring network responding to the ring signal received over the telephone line to activate said first relay means and cause said contact means to connect said audio network across said telephone line, said adapter unit including: electric circuitry connected to one terminal of the telephone line and including first capacitor means presenting relatively low impedance to said ring signal to pass said ring signal to said ring network thereby to activate said first relay means, and said circuitry presenting relatively high impedance to other signals received over the telephone line to attenuate said other signals and thereby prevent said other signals from reaching said input/output circuit; and second relay means connected to a second terminal of said telephone lines and having normally open contacts connected across said capacitor means, said second relay means being responsive to the activation of said first relay means to shunt out said circuitry and cause message signals received over the telephone line to be introduced to said input/output circuit, and said second relay means remaining energized so long as said first relay means is activated but being responsive to changes in current flow in said telephone line to cause said circuitry to be interposed between said telephone line and said telephone answering system to assure deactivation of said first relay means and effectively to isolate said telephone answering system from said telephone line.

2. The adapter unit defeindc in claim 1 and which includes second capacitor means connected across said energizing coil of said second relay means, said first and second capacitor means presenting a relatively low impedance to the aforesaid ring signal to cause said ring signal to be passed through said adapter unit from said telephone line to said ring signal network of said telephone answering system.

* * * * *